United States Patent
Boualleg et al.

(10) Patent No.: US 11,577,964 B2
(45) Date of Patent: Feb. 14, 2023

(54) METHOD FOR PRODUCING AN ALUMINA GEL HAVING A HIGH DISPERSIBILITY AND A SPECIFIC CRYSTALLITE SIZE

(71) Applicant: IFP Energies Nouvelles, Rueil-Malmaison (FR)

(72) Inventors: Malika Boualleg, Villeurbanne (FR); Olivier Lafon, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 359 days.

(21) Appl. No.: 17/011,611

(22) Filed: Sep. 3, 2020

(65) Prior Publication Data

US 2020/0399138 A1 Dec. 24, 2020

Related U.S. Application Data

(62) Division of application No. 16/072,016, filed as application No. PCT/EP2017/051258 on Jan. 20, 2017, now abandoned.

(30) Foreign Application Priority Data

Jan. 29, 2016 (FR) ..................................... 1650747

(51) Int. Cl.
*C01F 7/34* (2006.01)
*B01J 13/00* (2006.01)
(Continued)

(52) U.S. Cl.
CPC ............... *C01F 7/34* (2013.01); *B01J 13/006* (2013.01); *B28B 3/20* (2013.01); *B28B 11/243* (2013.01);
(Continued)

(58) Field of Classification Search
CPC .. C01F 7/34; B01J 13/006; B28B 3/20; B28B 11/243
See application file for complete search history.

(56) References Cited

U.S. PATENT DOCUMENTS

2017/0121181 A1   5/2017  Boualleg et al.

FOREIGN PATENT DOCUMENTS

GB          2123804 A        2/1984
WO      2015/189203 A1      12/2015

OTHER PUBLICATIONS

International Search Report dated Mar. 22, 2017 issued in corresponding PCT/EP2017/051258 application (2 pages).
(Continued)

*Primary Examiner* — James A Fiorito
(74) *Attorney, Agent, or Firm* — Millen White Zelano and Branigan, PC; Csaba Henter

(57) ABSTRACT

Process for preparing alumina gel in a single precipitation step consisting of dissolving an aluminium precursor, aluminium chloride, in water, at a temperature of 10° C. to 90° C. such that the pH of the solution is from 0.5 to 5, for a period of 2 to 60 minutes, then adjusting the pH to 7.5 to 9.5 by adding a basic precursor, sodium hydroxide, to the solution obtained to obtain a suspension, at a temperature of 5° C. to 35° C., and for 5 minutes to 5 hours, followed by a filtration step, said process not comprising any washing steps. Also, novel alumina gel having a high dispersibility index, in particular a dispersibility index of more than 80%, a crystallite dimension of 0.5 to 10 nm, a chlorine content of 0.001% to 2% by weight and a sodium content of 0.001% to 2% by weight, the percentages by weight being expressed with respect to the total weight of the alumina gel.

12 Claims, 2 Drawing Sheets boehmite obtained in Example 2

(51) Int. Cl.
*B28B 3/20* (2006.01)
*B28B 11/24* (2006.01)

(52) U.S. Cl.
CPC ...... *C01P 2002/04* (2013.01); *C01P 2002/60* (2013.01); *C01P 2002/72* (2013.01); *C01P 2004/64* (2013.01); *C01P 2006/22* (2013.01); *C01P 2006/80* (2013.01)

(56) References Cited

OTHER PUBLICATIONS

T. Sato, "Preparation of Gelatinous Aluminium Hydroxide", Zeitschrift Fur Anorganische Und Allgemeine Chemie, vol. 391, No. 1 (Jul. 1972) pp. 69-78.

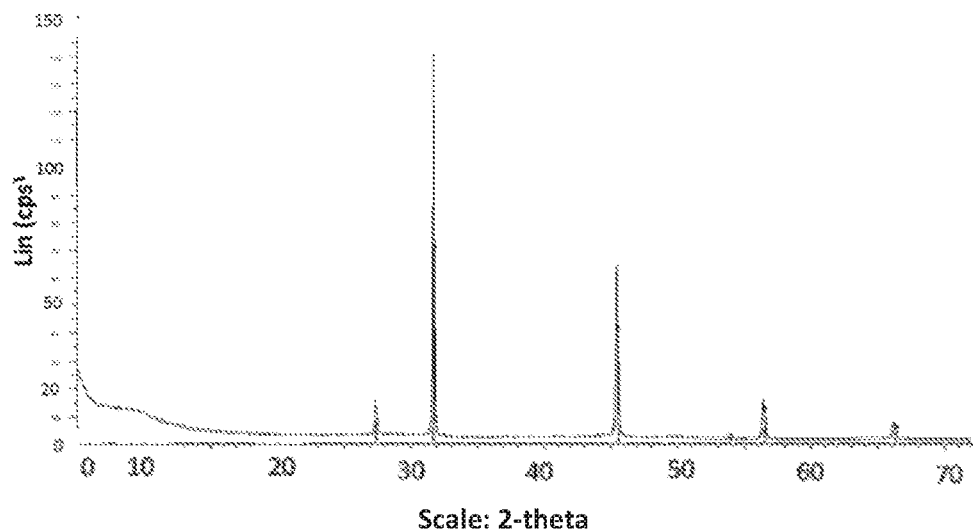
Fig. 1: boehmite obtained in Example 2
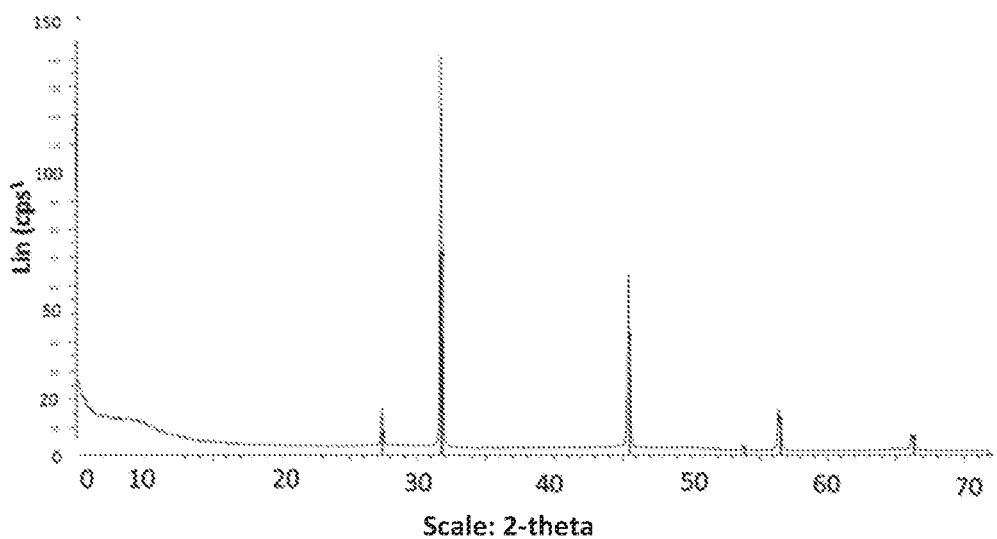
Fig. 2: boehmite obtained in Example 3

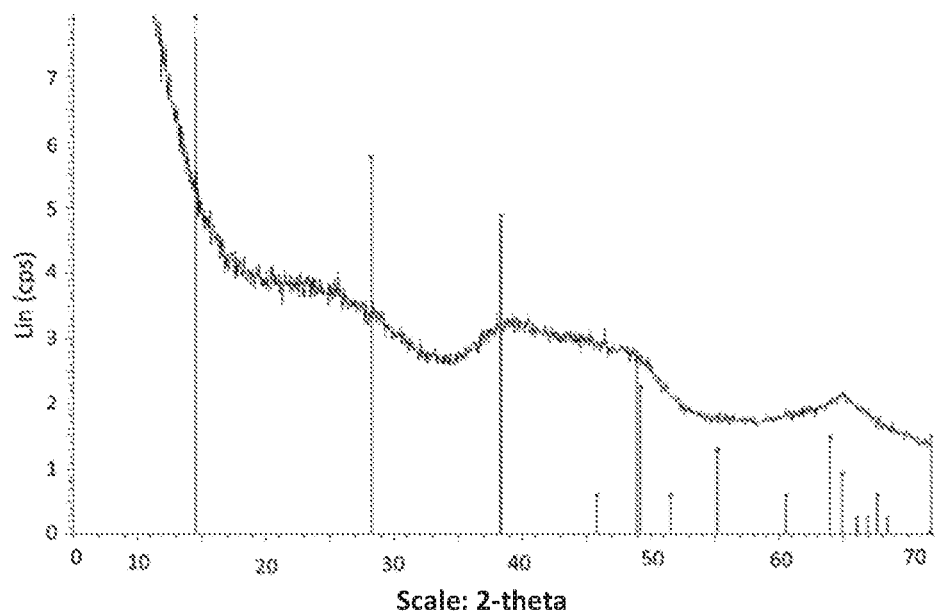
Fig. 3: boehmite obtained in Example 4
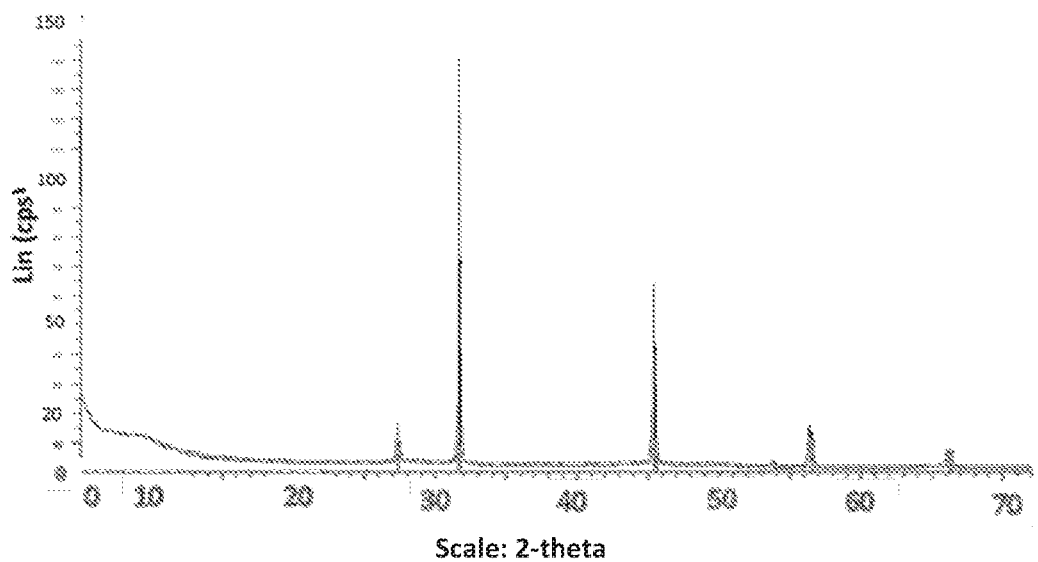
Fig. 4: boehmite obtained in Example 5

METHOD FOR PRODUCING AN ALUMINA GEL HAVING A HIGH DISPERSIBILITY AND A SPECIFIC CRYSTALLITE SIZE

TECHNICAL FIELD OF THE INVENTION

The present invention relates to the preparation of alumina gels or boehmite gels. In particular, the present invention relates to a process for the preparation of alumina gels, comprising a single precipitation step consisting of dissolving a specific acidic aluminium precursor, aluminium chloride, in water at a temperature in the range 10° C. to 90° C., in a manner such that the pH of the solution is in the range 0.5 to 5, for a period in the range 2 to 60 minutes, then adjusting the pH to a pH in the range 7.5 to 9.5 by adding a specific basic precursor, sodium hydroxide, to the solution obtained in order to obtain a suspension, at a temperature in the range 5° C. to 35° C., and for a period in the range 5 minutes to 5 hours, followed by a filtration step of the suspension obtained in order to obtain a precipitate, said process not comprising any washing steps after said filtration step.

The process in accordance with the invention can be used to obtain an alumina gel with a high dispersibility and a reduced crystallite size.

The present invention also relates to a novel alumina gel with a high dispersibility index, and in particular a dispersibility index of more than 80%, a crystallite dimension, obtained by the Scherrer X ray diffraction formula along the crystallographic directions [020] and [120], respectively in the range 0.5 to 10 nm and in the range 0.5 to 15 nm, as well as a chlorine content in the range 0.001% to 2% by weight and a sodium content in the range 0.001% to 2% by weight, the percentages by weight being expressed with respect to the total weight of the alumina gel.

The alumina gel prepared in this manner may then advantageously be shaped in order to be used as a catalyst support in many refining processes. In the case in which the alumina gel is shaped into the form of alumina beads, they may be used as a catalyst support in oligomerization or catalytic reforming processes. The alumina beads obtained in this manner may also be used as an adsorbent.

PRIOR ART

Several operating protocols which are known in the prior art result in dispersible alumina gels. Several patents describe in particular a preparation process known as "sol-gel".

The patent U.S. Pat. No. 4,676,928 describes a process for the production of an alumina which is dispersible in water, comprising a step for forming an aqueous dispersion of alumina, a step for adding an acid in order to produce an acidic dispersion with a pH in the range 5 to 9, a step for maturation at a high temperature of more than 70° C. for a period which is sufficient to transform the alumina into a colloidal gel, then a step for drying said colloidal gel obtained.

The patent U.S. Pat. No. 5,178,849 also describes a process for the production of an alpha alumina, comprising a step for dispersion of an aluminium hydrate with a dispersibility of less than 70%, a step for acidification of the dispersion obtained at a pH of less than 3.5 in order to at least partially dissolve the aluminium hydrate, a step for hydrothermal treatment of the acidic dispersion obtained at a temperature in the range 150° C. to 200° C., a pressure in the range 5 to 20 atm for a period in the range 0.15 to 4 hours in order to obtain a colloidal boehmite with a dispersibility of more than 90%.

The preparation of an alumina gel by precipitation is also well known in the prior art.

In particular, the patent U.S. Pat. No. 7,790,652 describes the preparation by precipitation of an alumina support with a very specific pore distribution, which can be used as a catalyst support in a process for the hydroconversion of heavy hydrocarbon feeds.

The alumina support is prepared in accordance with a method comprising a first step for the formation of an alumina dispersion by mixing, in a controlled manner, a first aqueous alkaline solution and a first aqueous acidic solution, at least one of said acidic and basic solutions or both of them comprising an aluminium compound. The acidic and basic solutions are mixed in proportions such that the pH of the resulting dispersion is in the range 8 to 11. The acidic and basic solutions are also mixed in quantities which may be used to obtain a dispersion containing the desired quantity of alumina; in particular, the first step can be used to obtain 25% to 35% by weight of alumina with respect to the total quantity of alumina formed at the end of the two precipitation steps. The first step is operated at a temperature in the range 20° C. to 40° C.

When the desired quantity of alumina has been formed, the temperature of the suspension is increased to a temperature in the range 45° C. to 70° C., then the heated suspension undergoes a second precipitation step by bringing said suspension into contact with a second aqueous alkaline solution and a second aqueous acidic solution, at least one of the two solutions or both of them comprising an aluminium compound. Similarly, the pH is adjusted to between 8 and 10.5 by the proportions of acidic and basic solutions which are added and the remaining quantity of alumina to be formed in the second step is supplied via the quantities of the second acidic and basic solutions which are added. The second step is operated at a temperature in the range 20° C. to 40° C. The alumina gel formed in this manner comprises at least 95% of boehmite. The dispersibility of the alumina gel obtained in this manner is not mentioned. The alumina gel is then filtered, washed and optionally dried using methods which are known to the person skilled in the art, without a prior hydrothermal treatment step, in order to produce an alumina powder which is then shaped using methods which are known to the person skilled in the art, then calcined in order to produce the final alumina support.

The Applicant has now discovered that a process for the preparation of an alumina gel in a single precipitation step, said step consisting of dissolving a specific acidic aluminium precursor, aluminium chloride, followed by adjusting the pH using a specific basic precursor, sodium hydroxide, without a subsequent co-precipitation step, results in an alumina gel which has small crystallites.

In particular, the preparation process in accordance with the invention can be used to obtain alumina gel or boehmite composed of crystallites the size of which, obtained by the Scherrer X ray diffraction formula along the crystallographic directions [020] and [120], are respectively in the range 0.5 to 10 nm and in the range 0.5 to 15 nm, and preferably in the range 0.5 to 2 nm and in the range 0.5 to 3 nm, and highly preferably respectively in the range 0.5 to 1.5 and in the range 0.5 to 2.5.

Furthermore, the novel preparation process in accordance with the invention is also characterized by an absence of washing of the precipitate obtained at the end of the precipitation step, after filtration of said precipitate.

In fact, the Applicant has also discovered that employing specific operating conditions for the pH and temperatures of the precipitation step a), combined with the absence of washing of the precipitate obtained at the end of the precipitation step after filtration, not only can produce an alumina gel which has small crystals, but also can produce an alumina gel with a very high dispersibility, preferably more than 80%, and which might even reach 100%.

Said process in accordance with the invention can thus be used to obtain an alumina gel having a better dispersibility index compared with prior art alumina gels, thereby facilitating shaping thereof using techniques which are known to the person skilled in the art.

The absence of a washing step also results in substantial savings in water, better productivity for the process in accordance with the invention as well as easier extrapolation of the process to the industrial scale.

Summary and Advantage of the Invention

The invention concerns a process for the preparation of an alumina gel in a single precipitation step a), said precipitation step consisting of dissolving an acidic aluminium precursor, aluminium chloride, in water at a temperature in the range 10° C. to 90° C., in a manner such that the pH of the solution is in the range 0.5 to 5, for a period in the range 2 to 60 minutes, then adjusting the pH to a pH in the range 7.5 to 9.5 by adding a basic precursor, sodium hydroxide, to the solution obtained in order to obtain a suspension, at a temperature in the range 5° C. to 35° C., and for a period in the range 5 minutes to 5 hours, and a filtration step b) of the suspension obtained at the end of step a), said process not comprising any steps for washing the precipitate obtained at the end of the filtration step b).

One advantage of the present invention is that a preparation process is provided which can be used to obtain an alumina gel having a reduced crystallite dimension compared with alumina gels prepared in accordance with the prior art, and in particular having small crystals.

Another advantage of the present invention is that a process is provided for the preparation of an alumina gel which, because of the specific operating conditions employed, namely pH and the temperatures for the precipitation step a), combined with the absence of washing the precipitate obtained at the end of the precipitation step, after filtration, can not only produce an alumina gel with small crystals, but also can produce an alumina gel with a very high dispersibility, preferably more than 80% and possibly even up to 100%.

Another advantage of the present invention is that a process is provided for the preparation of an alumina gel with reduced crystallite dimensions, which is simplified and cheaper compared with conventional prior art alumina preparation processes such as, for example, sol-gel type preparation processes, in that the process in accordance with the invention comprises only a single precipitation step and does not comprise any steps for washing the precipitate obtained.

The present invention also concerns a novel alumina gel having a high dispersibility index, and in particular a dispersibility index of more than 80%, a crystallite dimension, obtained by the Scherrer X ray diffraction formula along the crystallographic directions [020] and [120], respectively in the range 0.5 to 10 nm and in the range 0.5 to 15 nm, as well as a chlorine content in the range 0.001% to 2% by weight and a sodium content in the range 0.001% to 2% by weight, the percentages by weight being expressed with respect to the total weight of the alumina gel.

One advantage of the invention is that a novel alumina gel is provided which has a very high dispersibility compared with alumina gels of the prior art.

An alumina gel characterized by a high dispersibility index will be more easily shaped using any of the shaping techniques known to the person skilled in the art such as, for example, mixing-extrusion, granulation or by the oil-drop technique, than a gel with a low dispersibility index.

DESCRIPTION OF THE INVENTION

The present invention concerns an alumina gel having a high dispersibility index, and in particular a dispersibility index of more than 80%, a crystallite dimension, obtained by the Scherrer X ray diffraction formula along the crystallographic directions [020] and [120], respectively in the range 0.5 to 10 nm and in the range 0.5 to 15 nm, as well as a chlorine content in the range 0.001% to 2% by weight and a sodium content in the range 0.001% to 2% by weight, the percentages by weight being expressed with respect to the total weight of the alumina gel.

Throughout the remainder of the text, the term "dispersibility index" is defined as the weight of peptised alumina gel which can be dispersed by centrifuging in a polypropylene tube at 3500 G for 3 min.

The dispersibility is measured by dispersing 10% of boehmite or alumina gel in a suspension of water also containing 10% of nitric acid with respect to the mass of boehmite. Next, the suspension is centrifuged at 6000 rpm for 10 min. The collected sediments are dried overnight at 100° C. then weighed.

The dispersibility index, denoted DI, is obtained by the following calculation: DI (%)=100%−mass of dried sediments (%).

Throughout the remainder of the text, X ray diffraction of the alumina gels or boehmites was carried out employing the conventional powder method with the aid of a diffractometer.

Scherrer's formula is a formula used in the X ray diffraction of polycrystalline powders or samples that links the width at half height of the diffraction peaks to crystallite dimension. It is described in detail in the reference: Appl. Cryst. (1978). 11, 102-113, Scherrer after sixty years: A survey and some new results in the determination of crystallite dimension, J. I. Langford and A. J. C. Wilson.

Preferably, the alumina gel in accordance with the invention has a dispersibility index in the range 80% to 100%, preferably in the range 85% to 100%, highly preferably in the range 88% to 100% and yet more preferably in the range 90% to 100%.

In accordance with the invention, the alumina gel or boehmite in the form of a powder in accordance with the invention is composed of crystallites the dimensions of which, obtained by the Scherrer X ray diffraction formula along the crystallographic directions [020] and [120], are respectively in the range 0.5 to 10 nm and in the range 0.5 to 15 nm.

Preferably, the alumina gel in accordance with the invention has a crystallite dimension in the crystallographic direction in the range 0.5 to 2 nm and a crystallite dimension in the [120] crystallographic direction in the range 0.5 to 3 nm, and highly preferably respectively in the range 0.5 to 1.5 and in the range 0.5 to 2.5.

In accordance with the invention, the alumina gel prepared in accordance with the invention has an impurities content, in particular chlorine, measured by X ray fluorescence, in the range 0.001% to 2% by weight and a sodium content, measured by ICP, or inductively coupled plasma spectrometry, in the range 0.001% to 2% by weight, the percentages by weight being expressed with respect to the total weight of the alumina gel.

Preferably, the alumina gel prepared in accordance with the invention comprises a chlorine content in the range 0.001% to 1% by weight, preferably in the range 0.001% to 0.70% by weight, highly preferably in the range 0.003% to 0.60% by weight, and yet more preferably in the range 0.005% to 0.50% by weight.

Preferably, the alumina gel prepared in accordance with the invention comprises a sodium content in the range 0.001% to 1% by weight, preferably in the range 0.001% to 0.80% by weight, highly preferably in the range 0.0015% to 0.60% by weight, and 0.002% to 0.050% by weight.

Preparation Process

In accordance with the invention, the process for the preparation of the alumina gel in accordance with the invention comprises and is preferably constituted by a single precipitation step a), said precipitation step consisting of dissolving an acidic aluminium precursor, aluminium chloride, in water at a temperature in the range 10° C. to 90° C., in a manner such that the pH of the solution is in the range 0.5 to 5, for a period in the range 2 to 60 minutes, then adjusting the pH to a pH in the range 7.5 to 9.5 by adding a basic precursor, sodium hydroxide, to the solution obtained in order to obtain a suspension, at a temperature in the range 5° C. to 35° C., and for a period in the range 5 minutes to 5 hours, a filtration step b) of the suspension obtained at the end of step a) in order to obtain a precipitate, said process not comprising any washing steps after said filtration step b), said filtration step optionally being followed by a drying step for said precipitate in order to obtain an alumina powder, and said drying step optionally being followed by a shaping step for said alumina powder in order to obtain a green material, and said green material in turn may then optionally undergo at least one heat treatment step.

Said precipitation step consists of dissolving a specific acidic aluminium precursor, namely aluminium chloride $AlCl_3$, in water, at a temperature in the range 10° C. to 90° C., preferably in the range 10° C. to 80° C., more preferably in the range 10° C. to 75° C. and most preferably in the range 15° C. to 70° C. The pH of the solution obtained is in the range 0.5 to 5, preferably in the range 1 to 4, preferably in the range 1.5 to 3.5. The solution is stirred for a period in the range 2 to 60 minutes, and preferably for 5 to 30 minutes and preferably in the range 5 to 10 minutes.

The pH of the suspension obtained is then adjusted to a pH termed the terminal precipitation pH in the range 7.5 to 9.5, preferably in the range 7.5 to 9 and more preferably in the range 7.7 to 8.8 by adding a specific basic precursor, namely sodium hydroxide, NaOH, at a temperature in the range 5° C. to 35° C., preferably in the range 10° C. to 30° C. and more preferably in the range 10° C. to 25° C. and for a period in the range 5 minutes to 5 hours, preferably in the range 10 minutes to 5 hours, preferably in the range 15 minutes to 2 hours.

Adding NaOH means that the boehmite can be precipitated and a suspension can be obtained.

Preferably, the precipitation is carried out in the absence of an organic additive.

Preferably, the precipitation of the alumina gel is carried out with stirring.

Preferably, the process in accordance with the invention does not comprise a supplemental step for precipitation and does not comprise a subsequent co-precipitation step by contact, in an aqueous reaction medium, of at least one basic precursor with at least one acidic precursor, at least one of the precursors, basic or acidic, comprising aluminium.

The choice of specific precursors associated with the selected temperature and pH conditions means that an alumina gel with reduced crystallite dimensions compared with alumina gels prepared in accordance with the prior art may be obtained, and in particular an alumina gel or boehmite composed of crystallites the dimensions of which, obtained by the Scherrer X ray diffraction formula along the crystallographic directions [020] and [120], is respectively in the range 0.5 to 10 nm and in the range 0.5 to 15 nm, and preferably respectively in the range 0.5 to 2 nm and in the range 0.5 to 3 nm, and highly preferably respectively in the range 0.5 to 1.5 and in the range 0.5 to 2.5.

In accordance with the invention, the process for the preparation of the alumina gel in accordance with the invention also comprises a filtration step b) of the suspension obtained at the end of the precipitation step in order to obtain a precipitate.

Said filtration step is carried out in accordance with methods which are known to the person skilled in the art.

In accordance with the invention, the preparation process does not comprise any steps for washing the precipitate obtained at the end of the filtration step.

The alumina gel obtained at the end of the precipitation step, followed by a filtration step b) and without any washing steps for the precipitate obtained, may then advantageously be dried in a drying step for said precipitate obtained at the end of the filtration step in order to obtain a powder, said drying step advantageously being carried out by drying at a temperature of 100° C. or more, or by spray drying or by any other drying technique which is known to the person skilled in the art.

In the case in which said drying step is carried out by drying at a temperature of 100° C. or more, said drying step may advantageously be carried out in a closed and ventilated oven. Preferably, said drying step is operated at a temperature in the range 100° C. to 300° C., highly preferably at a temperature in the range 120° C. to 250° C.

In the case in which said drying step is carried out by spray drying, the cake obtained at the end of the second precipitation step, followed by a filtration step, is taken up into suspension. Said suspension is then sprayed in fine droplets into a vertical cylindrical chamber in contact with a stream of hot air in order to evaporate the water in accordance with a principle which is well known to the skilled person. The powder obtained is entrained by the flow of heat up to a cyclone or a sleeve filter which will separate the air from the powder.

Preferably, in the case in which said drying step is carried out by spray drying, spray drying may be carried out in accordance with the operating protocol described in the publication Asep Bayu Dani Nandiyanto, Kikuo Okuyama, Advanced Powder Technology, 22, 1-19, 2011.

The powder obtained at the end of the optional drying step may then advantageously be shaped in order to obtain a green material.

The term "green material" means the shaped material which has not undergone heat treatment steps.

Preferably, said shaping step may be carried out by mixing-extrusion, granulation, by the oil-drop technique, or by pelletization.

Highly preferably, said shaping step is carried out by mixing-extrusion or by oil-drop.

The green material obtained and optionally shaped may optionally then undergo a step for heat treatment at a temperature in the range 500° C. to 1000° C., for a period advantageously in the range 2 to 10 h, in the presence or absence of a stream of air containing up to 60% by volume of water.

Preferably, said heat treatment is carried out in the presence of a stream of air containing water.

Preferably, said heat treatment step is operated at a temperature in the range 540° C. to 850° C.

Preferably, said heat treatment step is operated for a period in the range 2 h to 10 h.

Said heat treatment step enables the boehmite to be transformed into the final alumina.

The heat treatment step may optionally be preceded by drying at a temperature in the range 50° C. to 120° C., in accordance with any technique which is known to the person skilled in the art.

The process in accordance with the invention may be used to obtain an alumina gel, optionally in the powder form, having crystallites with reduced dimensions compared with alumina gels prepared in accordance with the prior art.

In particular, the alumina gel or boehmite obtained in the form of powder in accordance with the invention is composed of crystallites the dimension of which, obtained by the Scherrer X ray diffraction formula along the crystallographic directions [020] and [120], is respectively in the range 0.5 to 10 nm and in the range 0.5 to 15 nm and preferably respectively in the range 0.5 to 2 nm and in the range 0.5 to 3 nm, and highly preferably respectively in the range 0.5 to 1.5 and in the range 0.5 to 2.5.

The present invention also concerns the alumina gel which is capable of being obtained using the preparation process in accordance with the invention.

The invention will now be illustrated by the examples below, which in no case are limiting in nature.

The productivity when producing the suspension obtained at the end of the precipitation step a) is improved by the absence of a washing step, which favours the productivity of the process (economising on water, and a much shorter time for synthesis of the boehmite than in conventional processes) in accordance with the invention, as well as an extrapolation of the process to an industrial scale. The absence of washing and thus the major presence of salts on the surface of the boehmite crystallites means that an alumina gel with an improved dispersibility is obtained.

BRIEF DESCRIPTION OF THE DRAWINGS

FIG. 1 shows the XRD of the precipitate obtained in Example 2 confirming that it is a precipitate of boehmite and is highly crystalline.

FIG. 2 shows the XRD of the precipitate obtained in Example 3 confirming that it is a precipitate of boehmite and is highly crystalline.

FIG. 3 shows the XRD of the precipitate obtained in Example 4 confirming that it is a precipitate of boehmite and has low crystallinity.

FIG. 4 shows the XRD of the precipitate obtained in Example 5 confirming that it is a precipitate of boehmite and has low crystallinity.

EXAMPLES

Example 1: (Comparative, Sol-Gel)

A commercial alumina gel powder, Pural SB3, was prepared using a sol-gel route, by hydrolysis-polycondensation of an aluminium alkoxide.

The characteristics of the Pural SB3 boehmite gel are summarized in Table 1.

TABLE 1

Characteristics of Pural SB3.

|  | Commercial alumina gel |
|---|---|
| Dispersibility index (%) | 98 |
| Dimension [020] (nm) | 3.1 |
| Dimension [120] (nm) | 4.7 |
| Sodium Na (% by wt) | <detection limit |
| Chlorine Cl (% by wt) | <detection limit |

The chlorine content was measured using the X ray fluorescence method, and the sodium content was measured by ICP, or inductively coupled plasma spectrometry, and were below the detection limits for these measurement methods.

The alumina gel obtained had a very good dispersibility index but large crystallite dimensions.

Example 2 (Comparative, High Temperature without Washing)

An alumina gel was prepared in accordance with a synthesis process which was not in accordance with the invention, in that the temperature at which precipitation of the alumina gel was carried out was a temperature which was higher than 35° C.

Precipitation of Boehmite, AlOOH

In a beaker cooled in an ice bath, a solution was prepared containing 326 mL of deionized water and 135.6 g of aluminium chloride hexahydrate ($AlCl_3.6H_2O$) at a temperature of 55° C., in a manner such as to obtain a solution with a pH of 0.5, over a period of 5 minutes.

Next, with magnetic stirring, 67.5 g of sodium hydroxide (NaOH) was added over 30 minutes in a manner such as to adjust the pH. The pH reached at the end of the synthesis was 8. The temperature was maintained at 55° C. throughout the duration of the step. The solid was then filtered.

A sample of the precipitate obtained was removed from the reaction medium. The XRD (FIG. 1) of the precipitate showed that the precipitate obtained in Example 2 was in fact a precipitate of boehmite. The precipitate of boehmite obtained in Example 2 was highly crystalline.

The size of the crystallites of boehmite obtained were measured using Scherrer's method.

The characteristics of the gel obtained in accordance with Example 2 are summarized in Table 2.

TABLE 2

Characteristics of gel obtained in accordance with Example 2

|  | Example |
|---|---|
| Dispersibility index (%) | 25 |
| Dimension [020] (nm) | 2.9 |
| Dimension [120] (nm) | 3.6 |
| Sodium Na (% by wt) | 1.4 |
| Chlorine Cl (% by wt) | 1.9 |

A high precipitation temperature had resulted in an alumina gel with large crystallite dimensions and a mediocre dispersibility index.

Example 3 (Comparative, High pH without Washing)

An alumina gel was prepared in accordance with a synthesis process which was not in accordance with the invention, in that the pH following precipitation of the alumina gel was a pH higher than 9.5.

Precipitation of Boehmite, AlOOH

In a beaker cooled in an ice bath, a solution was prepared containing 326 mL of deionized water and 135.6 g of aluminium chloride hexahydrate ($AlCl_3.6H_2O$) at a temperature of 20° C., in a manner such as to obtain a solution with a pH of 0.5, over a period of 5 minutes.

Next, with magnetic stirring, 67.5 g of sodium hydroxide (NaOH) was added over 30 minutes in a manner such as to adjust the pH. The pH reached at the end of the synthesis was 10.5. The temperature was maintained at 20° C. throughout the duration of the step. The solid was then filtered.

A sample of the precipitate obtained was removed from the reaction medium. The XRD (FIG. 2) of the precipitate showed that the precipitate obtained in Example 3 was in fact a precipitate of boehmite. The boehmite precipitate obtained in Example 3 was highly crystalline.

The characteristics of the gel obtained in accordance with Example 3 are summarized in Table 3.

TABLE 3

Characteristics of gel obtained in accordance with Example 3

|  | Example |
|---|---|
| Dispersibility index Ta = 10% (%) | 48 |
| Dimension [020] (nm) | 2.4 |
| Dimension [120] (nm) | 3.1 |
| Sodium Na (% by wt) | 1.4 |
| Chlorine Cl (% by wt) | 1.85 |

A high precipitation pH had resulted in large crystallite dimensions and the gel obtained had a mediocre dispersibility index.

Example 4 (Comparative, pH and T in Accordance but Intense Washing)

An alumina gel was prepared in accordance with a synthesis process which was not in accordance with the invention, in that the precipitate was washed following the filtration step.

Precipitation of Boehmite, AlOOH

In a beaker cooled in an ice bath, a solution was prepared containing 326 mL of deionized water and 135.6 g of aluminium chloride hexahydrate ($AlCl_3.6H_2O$) at a temperature of 25° C., in a manner such as to obtain a solution with a pH of 0.5, over a period of 5 minutes.

Next, with magnetic stirring, 67.5 g of sodium hydroxide (NaOH) was added over 30 minutes in a manner such as to adjust the pH. The pH reached at the end of the synthesis was 8. The temperature was maintained at 20° C. throughout the duration of the step. The solid was then filtered and washed with 3 L of demineralized water.

A sample of the precipitate obtained was removed from the reaction medium. The XRD (FIG. 3) of the precipitate showed that the precipitate obtained in Example 4 was in fact a precipitate of boehmite. The boehmite precipitate obtained had low crystallinity.

The characteristics of the gel obtained in accordance with Example 4 are summarized in Table 4.

TABLE 4

Characteristics of gel obtained in accordance with Example 4

|  | Example |
|---|---|
| Dispersibility index Ta = 10% (%) | 30 |
| Dimension [020] (nm) | 2.1 |
| Dimension [120] (nm) | 2.8 |
| Sodium Na (% by wt) | <0.01 |
| Chlorine Cl (% by wt) | <0.02 |

Due to the intense washing of the precipitate obtained following the precipitation step, the crystallites had a large size and the gel obtained had a mediocre dispersibility index.

Example 5 (in Accordance with the Invention, pH and T in Accordance and No Washing)

An alumina gel was prepared in accordance with a synthesis process which was in accordance with the invention.

Precipitation of Boehmite, AlOOH

In a beaker cooled in an ice bath, a solution was prepared containing 326 mL of deionized water and 135.6 g of aluminium chloride hexahydrate ($AlCl_3.6H_2O$) at a temperature of 25° C., in a manner such as to obtain a solution with a pH of 0.5, over a period of 5 minutes.

Next, with magnetic stirring, 67.5 g of sodium hydroxide (NaOH) was added over 30 minutes in a manner such as to adjust the pH. The pH reached at the end of the synthesis was 8. The temperature was maintained at 20° C. throughout the duration of the precipitation step. The precipitate was then filtered, but no washing followed this step.

A sample of the precipitate obtained was removed from the reaction medium. The XRD (FIG. 4) of the precipitate showed that the precipitate obtained in Example 5 was in fact a precipitate of boehmite. The boehmite precipitate obtained in Example 5 was of low crystallinity.

The characteristics of the gel obtained in accordance with Example 5 are summarized in Table 5.

TABLE 5

Characteristics of gel obtained in accordance with Example 5

|  | Example |
|---|---|
| Dispersibility index (%) | 100 |
| Dimension [020] (nm) | 0.6 |
| Dimension [120] (nm) | 1.4 |
| Sodium Na (%) | 1.3 |
| Chlorine Cl (% by wt) | 1.75 |

The preparation process in accordance with the invention can be used to obtain a gel which is 100% dispersible and is also less expensive than in conventional prior art alumina preparation processes such as, for example, sol-gel type preparation processes using Pural SB3 as described in Example 1. Furthermore, the crystallite dimension is lower than that obtained by any other mode for the preparation of alumina gels known in the literature.

The invention claimed is:
1. A process for the preparation of an alumina gel, wherein the alumina gel has a dispersibility index of more than 80%, a crystallite dimension, obtained by the Scherrer X ray diffraction formula along the crystallographic directions

[020] and [120], respectively, in the range of 0.5 to 10 nm and in the range of 0.5 to 15 nm, a chlorine content in the range 0.001% to 2% by weight and a sodium content in the range 0.001% to 2% by weight, the percentages by weight being expressed with respect to the total weight of the alumina gel, the process comprising:

a single precipitation step (a) consisting of dissolving an acidic aluminium precursor, aluminium chloride, $AlCl_3$, in water, at a temperature in the range 10° C. to 90° C. and for a period in the range of 2 to 60 minutes, to obtain a solution, in a manner such that the pH of the solution is in the range of 0.5 to 5, then adjusting the pH to a pH in the range of 7.5 to 9.5 by adding a basic precursor, sodium hydroxide, to the solution obtained in order to obtain a suspension, at a temperature in the range 5° C. to 35° C. and for a period in the range of 5 minutes to 5 hours, and a filtration step b) of the suspension obtained at the end of step a) to obtain a precipitate, said process not comprising any steps for washing the precipitate obtained at the end of the filtration step b).

2. The process as claimed in claim 1, in which the acidic aluminium precursor, aluminium chloride, $AlCl_3$, is dissolved in water at a temperature in the range 10° C. to 75° C.

3. The process as claimed in claim 1, in which the pH of the solution of aluminium chloride, $AlCl_3$, in water, is in the range 1 to 4.

4. The process as claimed in claim 1, in which the pH is adjusted at a temperature in the range 10° C. to 30° C.

5. The process as claimed in claim 4, in which the pH is adjusted at a temperature in the range 10° C. to 25° C.

6. The process as claimed in claim 1, in which the pH is adjusted to a pH in the range 7.7 to 8.8.

7. The process as claimed in claim 1, in which the preparation process also comprises a drying step for the filtered suspension obtained at the end of the precipitation step in order to obtain a powder, said drying step being carried out by drying at a temperature of 100° C. or more or by spray drying.

8. The process as claimed in claim 7, in which the preparation process also comprises a shaping step of the powder obtained in order to obtain a green material.

9. The process as claimed in claim 8, in which the shaping step is carried out by mixing-extrusion or by oil-drop.

10. The process as claimed in claim 8, in which the shaped green material then undergoes a heat treatment step at a temperature in the range 500° C. to 1000° C., for a period in the range 2 to 10 h, in the presence or absence of a stream of air containing up to 60% by volume of water.

11. The process as claimed in claim 1, wherein the alumina gel has a dispersibility index in the range of 85% to 100%.

12. The process as claimed in claim 11, wherein the alumina gel has a dispersibility index in the range of 88% to 100%.

* * * * *